UNITED STATES PATENT OFFICE.

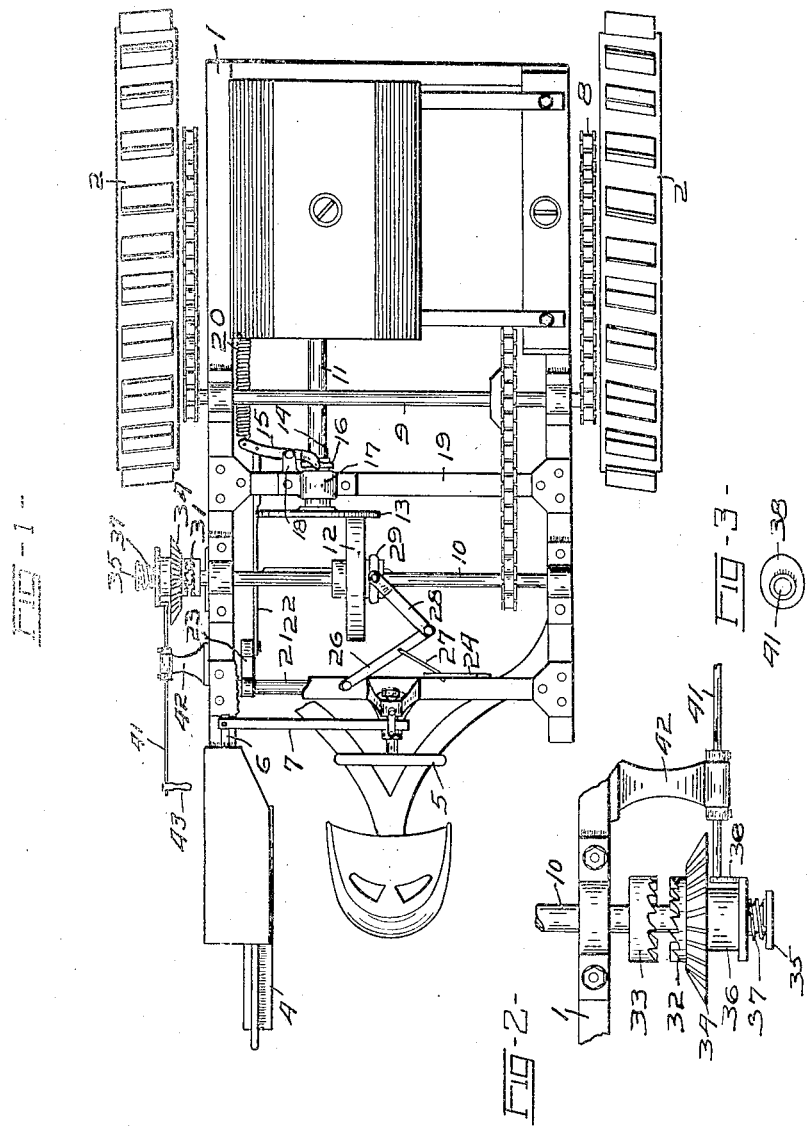

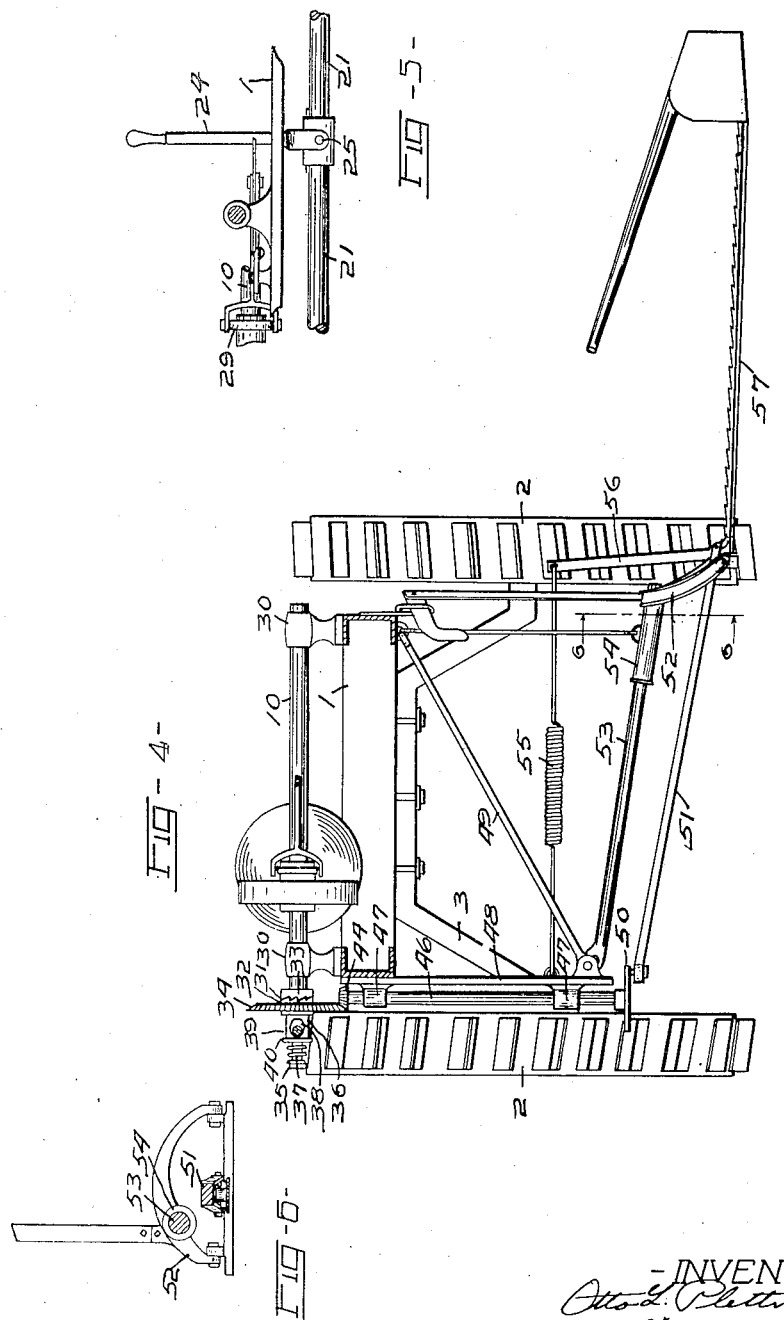

OTTO L. PLETTNER AND WILLIAM H. LOWE, OF CONTINENTAL, OHIO, ASSIGNORS TO THE CONTINENTAL TRACTOR COMPANY, OF CONTINENTAL, OHIO, A CORPORATION OF OHIO.

TRACTOR.

1,336,581.   Specification of Letters Patent.   Patented Apr. 13, 1920.

Application filed April 10, 1919. Serial No. 289,159.

*To all whom it may concern:*

Be it known that we, OTTO L. PLETTNER and WILLIAM H. LOWE, citizens of the United States, and residents of Continental, in the county of Putnam and State of Ohio, have invented a certain new and useful Tractor; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

Our invention particularly has for its object to provide a controlling mechanism for a tractor and particularly a controlling mechanism for a tractor and mower when the mower is used in connection with the tractor.

The invention may be contained in structures of different forms. We have selected one of such constructions for purposes of illustration and shall describe it hereinafter. The construction selected is illustrated in the accompanying drawings.

Figure 1 of the drawings is the top view of the tractor. Fig. 2 is a view of the clutch connecting the driving shaft of the engine to the mower. Fig. 3 is a cam for controlling the clutch illustrated in Fig. 2. Fig. 4 is a sectional view, showing the mower. Fig. 5 is a view of part of the mechanism for operating the drive. Fig. 6 is a sectional view taken on the line 6, 6 indicated in Fig. 4.

1, in the figures, is the frame of the tractor to which are connected the bull wheels 2 through an inverted U-bar 3. 4 is a guide wheel which operates to direct the tractor by operation of the steering wheel 5, the steering wheel 5 being connected with a bar 6 through a rod 7 by means of a pinion located on the post of the steering wheel 5 and a rack formed on the under side of the rod 7. The bar 6 is connected with the post of the caster-wheel for operating the caster-wheel to steer the tractor. This, however, is not fully shown in the drawing but forms no part of my invention.

The bull wheels 2 are driven by sprocket gear 8 through the shaft 9 which is connected by sprocket gear to the drive shaft
10. The shaft 10 is connected with the shaft 11 of the engine through a friction wheel 12 and disk 13. The friction wheel 12 is shifted across the face of the disk to obtain different speeds and to reverse the rotation of the shaft 10 in a manner well known in the art. The disk 13 is movable along the shaft 11 but is rotatably secured to the shaft by means of the key 14. It is shifted along the shaft by means of the lever 15 which is pivoted to the collar 16 located on the hub of the disk 13 which slides between the shaft 11 and the bearing 17. The lever 15 is fulcrumed on a bracket 18 that is secured to a cross bar 19. The end of the lever is connected to a spring 20. The other end of the spring is connected to the frame 1 in any suitable manner. The spring 20 operates to move the disk 13 up toward the wheel 12. The lever 15 is also connected to a rod 21 through a link 22 and an arm 23. The arm 23 is secured to the rod 21 so that rotation of the rod 21 clockwise operates to pull one end of the lever 15 against the retractile power of the spring 20 and so as to move the disk 13 away from the periphery of the wheel 12. The rod 21 is rotated by means of a lever 24 which is pivoted to the rod 21 by means of a pin 25. Forward and back rotations of the lever 24 with respect to the movements of the tractor operates to move the disk 13 to and away from the periphery of the wheel 12.

The lever 24 is connected to a toggle joint which connects the wheel 12 with a cross bar of the frame 1. The lever 24 is connected with the member 26 of the toggle joint by means of the link 27. The member 26 is connected to the frame 1 of the tractor while the member 28 of the toggle joint is connected to a slip-ring or collar 29 located in the groove of the wheel 12 so as to permit rotative movements of the hub of the wheel 12 with respect to the member 28. When the lever 24 is shifted back and forth transversely with respect to the movements of the tractor, the lever operates through the link 27 and the toggle joint to shift the wheel 12 across the face of the disk 13. By moving the lever forward, with respect to the forward movement of the tractor, the disk 13 will be moved away from the wheel 12 and the wheel 12 may be easily shifted by transverse movements of the lever 24.

The shaft 10 is supported in bearings 30 which are located on the frame 1. Near one end of the shaft is located a ratchet-face clutch 31 having the members 32 and 33. The member 33 is keyed to the shaft 10, while the member 32 is secured to or forms a part of the beveled gear wheel 34. The end of the shaft 10 is provided with a collar or flange 35 between which and the hub 36 of the wheel 34 is located a spring 37 which operates to yieldingly press the gear wheel 34 on the shaft 10 so as to cause engagement of the clutch. The engagement will be yielding in character when the shaft 10 rotates in one direction and will be positive when the shaft rotates in the other direction. If it is desired to shift the gear wheel 34 along the shaft 10 to disconnect the clutch parts and disconnect any agricultural implement that may be driven through the gear 34 from the shaft 10 it may be done by means of the cam 38 which is located in a channel 39 formed in the hub of the wheel and so as to operate on the flange 40 forming one side of the channel and a boss or enlargement of the wheel hub forming the other side of the channel. The cam 38 is connected to a rod 41 which is rotatably supported on a bracket 42 secured to the frame 1 of the tractor. An arm 43 is secured to the rod 41, and when rotated, the cam 38 is also rotated to shift the gear wheel 34 and its clutch member 32 along the shaft 10 to disconnect the gear wheel 34 from the gear wheel 44 and disconnect the clutch members 32 and 33.

The beveled gear 44 with which the beveled gear 34 meshes, is connected to a shaft 46 which is supported in bearings 47 located on the frame 1 and a downwardly projecting rod 48 which is secured to the frame 1 at its upper end and is braced by the rod 49 at its lower end. The shaft 46 is connected with the cutter bar of a mower through the wheel or disk 50 and the link 51 which is connected to the mower, in the manner well known in the art, for causing reciprocatory movements of the cutter bar.

The mower 57 is pivoted on the bracket 52 which is also pivoted on the rod 53 by means of the sleeve 54. The weight of the mower 52 is somewhat balanced by the spring 55 that connects the mower with the rod 48 through an arm 56 which is secured to the bracket 52.

The clutch 31, being provided with ratchet-face teeth, provides a means whereby there will be a positive connection for driving the gear wheel 44 and the blade of the mower when the tractor is moving forward but if the tractor should reverse its movement by operation of the friction wheel 12 the clutch parts will pass by each other and the operation of the mower blade will be discontinued, and then again upon forward movement of the tractor the blade of the mower will operate. This provides an automatic means for the protection of the mechanism connecting the mower blade and the driving shaft.

We claim as our invention:—

In a tractor, a shaft, a friction wheel located on the shaft, a friction disk co-acting with the friction wheel for driving the shaft, a lever for shifting the friction disk to and away from the friction wheel, a spring member connected to the end of the lever for moving the friction disk toward the friction wheel, a second lever, a link connecting the second named lever to the first named lever for moving the friction disk away from the friction wheel, a toggle joint connected to the friction wheel and to the frame of the tractor, the second named lever connected to the toggle joint for shifting the friction wheel along the shaft and across the face of the disk upon rotation in a direction at right angles to the rotation of the second named lever to shift the friction disk.

In testimony whereof we have hereunto signed our names to this specification.

OTTO L. PLETTNER.
WILLIAM H. LOWE.